June 6, 1950

C. A. KOTTERMAN 2,510,588

MOUNTING AND CONNECTING DEVICE FOR
METAL PLATE RECTIFIERS

Filed June 28, 1945

INVENTOR.
CHESTER A. KOTTERMAN

BY Kuesmer, Haag and Carlson.

ATTORNEYS

Patented June 6, 1950

2,510,588

UNITED STATES PATENT OFFICE 2,510,588

MOUNTING AND CONNECTING DEVICE FOR METAL-PLATE RECTIFIERS

Chester Arthur Kotterman, New York, N. Y., assignor to Kotron Rectifier Corporation, Newark, N. J., a corporation of New Jersey Application June 28, 1945, Serial No. 601,958

8 Claims. (Cl. 175—366)

This invention relates to electric current rectifiers of the type comprising asymetrical conductive couples of the metal-plate surface contact variety.

An object of the invention is to improve the means of mounting said couples and providing satisfactory electrical connections to the rectifying elements at the same time, combined with a simplified manufacturing procedure.

A further object of the invention is to provide a means for mounting a plurality of rectifier elements so that any heat developed in their operation will be efficiently dissipated and so that substantially no heat is conducted from one unit to any of the others.

Other objects of the invention will be apparent from the following description and accompanying drawings taken in connection with the appendant claims.

The invention comprises the features of construction, combination of elements, arrangements of parts and methods of manufacture referred to above, all of which will be fully described in the disclosure hereinafter set forth including the illustrations in the drawings.

Metal-plate rectifiers such as selenium, copper oxide and copper sulphide types are usually assembled into a stack of rectifier elements mounted on a common bolt, screw or threaded stud, said members passing through holes pierced in the individual rectifying elements. In the case of the copper oxide or copper sulphide rectifiers, considerable compression force is employed to insure good electrical contact to the active surfaces of the elements. There are certain rectifier applications, however, where the geometry of the stack assembly does not provide the best utilization of the space in which the rectifier is to be used. For instance, the conventional rectifier stack assembly on a stud or bolt would occupy a certain volume and this volume may be objectionable as in the case of a radio chassis assembly where the placement of the component parts is usually quite congested. If one dimension of the stack could be made very small compared to the other dimensions, a better space utilization would result. It is the object of this invention to disclose a mounting device for metal-plate rectifiers that will fulfill this condition. At the same time a satisfactory mechanical mounting will be provided together with means for making the required electrical contact to the active surfaces of the individual rectifying elements. Furthermore, a certain portion of the rectifying area at the center of the element must be sacrificed to the hole necessary for the bolt or stud assembly which can be saved by the mounting to be described herein. The present invention deals with a mounting device for the selenium type of metal-plate rectifier, although it will become apparent from a reading of the patent that any other type of metal-plate rectifier could be so mounted without departing from the spirit and scope of the invention.

The basic idea is to dispose one or more individual rectifying elements in a mounting in the form of a plane, the thickness of the mounting being very small in dimension compared to the other two dimensions that make up the volume. One embodiment would be to make polygonal depressions by embossing, moulding or otherwise forming a cavity surrounded by a table portion in a piece of fibre, plastic or other insulating media, the geometry of the cavity being such as to accommodate freely the geometry of the rectifying element, and deep enough to accept the rectifying element with its upper active surface or electrode in approximately the same plane as the plane of the table portion of the sheet of insulating material.

In the drawing in which the same reference characters designate similar parts:

Figure 1:
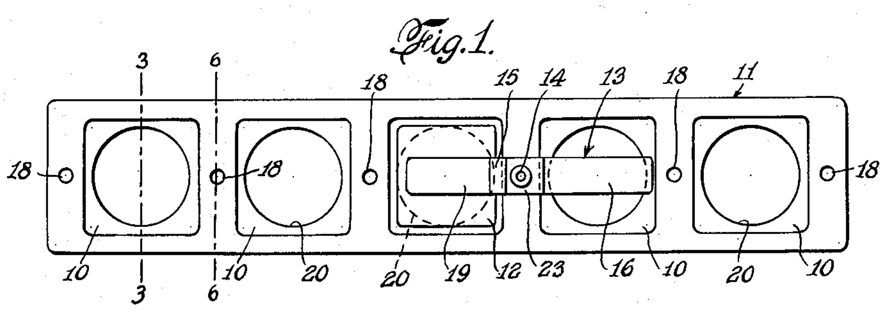
Fig. 1 is a top plan view of several rectifier units in their mounting plate.
Figure 3:
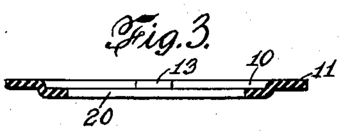
Fig. 3 is a cross-section on line 3—3 of Fig. 1.

In Fig. 1, 10 indicates one form of polygonal cavity embossed in a strip of vulcanized fibre, 11. In the case under discussion, 11 is a mechanical support for a five-element rectifier, the five elements to be connected in series in the following manner, said connections to form a part of the mechanical assembly. Fig. 3 which is an enlarged section on line 3—3 of Fig. 1 shows the details of the cavity.

Figure 4:
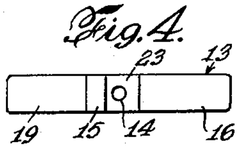
Fig. 4 is a top plan view of the metallic connector between rectifying elements.
Figure 5:
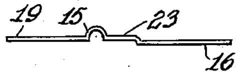
Fig. 5 is a front elevation of the metallic connector shown in Fig. 4.

In order to make electrical connection to the front and back electrodes of the metal-plate rectifier (here the word electrode is used to define the contacting surfaces of the rectifying element and does not necessarily imply an active surface), it is necessary to place against each electrode a metallic connector with sufficient pressure to effect good electrical contact, and of such area as to carry the current the rectifier will deliver. In the case of a selenium rectifier we may consider the individual rectifying elements 12 being disposed in the cavities with their counter-electrode side (metal alloy side) Fig. 1, upwards. One form of such a connector is shown by Fig. 4 which is a plan view of the connector 13. Fig. 5 is a front elevation edge view of the same. The connector could be made of spring brass, for instance. A hole 14, is pierced in the brass strip to take an eyelet or rivet hereinafter to be described. An arched section is formed in the brass connector as shown at 15, the function of which will be disclosed shortly. A step in the brass connector is also formed as at 16.

A rectifying element 12, Fig. 1, is placed in one of the cavities 10 with—say—the positive side or alloy side upward. Brass connector 13, is now positioned such that the hole 14 coincides with one of the holes 18 and in the position shown in Fig. 5 faces upward. The other portion of the brass connector 13 forming step 16 then fits into the adjacent cavity and lies flat on the bottom thereof. An eyelet or hollow rivet is now placed through a hole 14 in the brass strip and hole 18 in the fibre and set in the well-known manner. The arched section 15 in brass connector 13 serves to bridge over the edge margin of the rectifying element so that there is no likelihood of the brass strip contacting anything but the alloy layer. The spring finger or end 19, of the brass connector now makes intimate contact to the upper active surface of the rectifying element 12. The distance, however, from the center of the eyelet to spring finger 19 of connector 13 is such that there is no likelihood of connector 13 overlapping the upper active surface and contacting any other part of the rectifying element. In forming spring connector 13, out of spring brass, enough departure from a plane surface may be given to the spring brass strip such that when it is riveted into place, a certain degree of pressure due to the connector flattening out will be brought to bear upon the active surface of the rectifying element. The spring finger 19 of the brass connector 13 now makes connection to the positive side of the rectifying element. We now place another rectifying element into the adjacent cavity and the end or stepped section 16 of connector 13 will make connection to the underside or so-called negative side of the rectifying element thus positioned. Again we repeat the operation of applying a spring brass connector 13 as previously described and riveted into position and continue this succession of operations until all the cavities have been filled. The end connectors, of course, will be sections of the whole connector as shown in Figs. 4 and 5 and can serve as end terminal take-off to the external circuit.

The step 16, in connectors 13 which follows the wall of the cavity, locks the connector in position and prevents its turning. Obviously spring finger 19 pressing down on the alloy side of the rectifier element locks it in its cavity preventing it from falling out or otherwise being displaced. Holes 20, see Fig. 3, or sections of holes can be pierced in the bottom of the cavities to expose a large part of the area of one electrode to the surrounding air to effect better cooling if desired.

Figure 2:
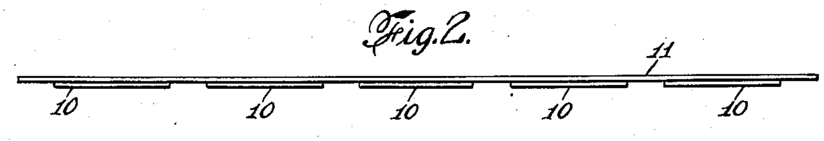
Fig. 2 is a front elevation of a mounting plate.
Figure 6:
Fig. 6 is a cross-sectional view of a modification of the mounting plate on a line corresponding to line 6—6 of Fig. 1.

In the foregoing described mounting, the rectifying element is confined in a cavity embossed or moulded in an insulating material. An obvious alternative method of supporting the rectifying element, and one which remains within the spirit and scope of the present invention would be to turn the edges of the strip through a right angle forming a channel section whose sides would constitute a part of the restraining mounting. Fig. 6 is a cross-section of such a channel shape. The rectifying element or elements 12 would fit between the inside surfaces of the turned up edges 21 preventing their lateral displacement. To prevent the rectifying elements from moving longitudinally with respect to each other, and to the channel form, transverse embossings or mouldings as 22 are made in the strip in such a manner that said embossings or mouldings would project above the plane of the bottom of the channel form and spaced with respect to each other a distance equal to the width or diameter of the rectifying element. The width of the raised portion would be such as to accommodate the central portion 23 of the metal connector 13 and would carry a hole 18 similar to those in the form shown in Figs. 1 and 2. The channel section form of support has one advantage over the previously described mounting in that the turned-up edges of the strip forming the channel section would act as reinforcing ribs preventing any tendency for the strip to bow or bend out of shape.

Figure 7:
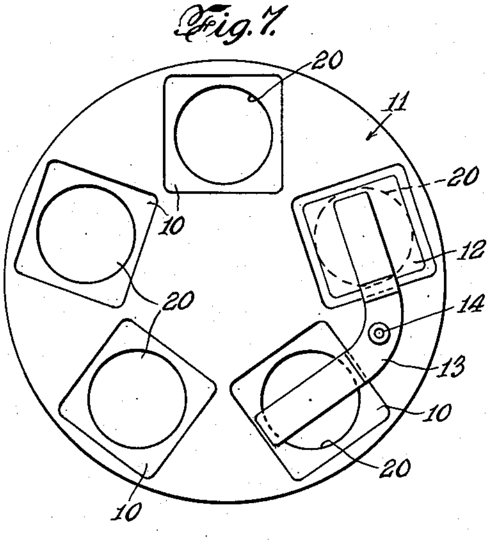
Fig. 7 is a plan view of a further modification of the mounting plate.

Fig. 7 indicates another embodiment of the invention. In this form the cavities 10 are formed in a circular or other polygonal form of insulating material 11, and connections are made in substantially the same manner as has already been described except the shape of the brass connectors 13 must be altered to nearly approximate the geometry of the connector as shown in Fig. 7.

What I claim as new and desire to secure by Letters Patent of the United States is:

1. A mounting device for metal plate rectifiers comprising a plate of insulating material having the body thereof deformed to provide a plurality of cavities therein, a first terminal strip of conductive material secured to said insulating plate outside of one of said cavities and extending into and along the bottom of said cavity, and a second terminal strip of conductive spring material secured to an adjacent insulating plate outside of said cavity and overlapping said cavity.

2. A mounting device for metal plate rectifiers comprising a plate of insulating material having the body thereof deformed to provide a plurality of shallow cavities therein and a table portion adjacent said cavities, a terminal strip of conductive material secured to said insulating plate outside of one of said cavities and extending into and along the bottom of said cavity, and a terminal spring mounted on said table portion and extending over an adjacent cavity.

3. A mounting device for mounting metal plate rectifiers in electrical series connection comprising a plate of insulating material having the body thereof deformed to provide a plurality of cavities adopted to receive rectifier units and table portions between said cavities, metal terminal strips mounted on said table portions and extending into the areas of said cavities, at least one of the terminal strips between a pair of adjacent cavities extending in one direction into and along the bottom of one of said pair of cavities and extending in the other direction to a position overlying the other one of said pair of cavities.

4. A mounting device for metal plate rectifiers comprising an embossed insulating fibre sheet having the body thereof deformed to provide shallow cavities therein to receive rectifier units, said sheet having an aperture therein in the bottom of each of said cavities, a first metal terminal strip, a rivet member securing said strip to said sheet outside said cavity, said strip extending into and along the bottom of said cavity, and in electrical contact with the lower face of one of said rect'fier units, a second terminal strip of spring metal, a rivet member securing said second strip to said sheet outside said cavity, said second strip extending to a point overlying an adjacent cavity and in electrical contact with the upper face of the rectifier unit in said adjacent cavity.

5. A metal plate rectifier unit comprising, in combination, a support plate of insulating material having cavities therein, a first terminal strip of conductive material secured to said plate outside of said cavities and extending into and along the bottom of one of said cavities, a metal plate rectifier in said cavity overlying said terminal strip in contact therewith, and a second terminal strip of spring metal secured to said insulating plate outside said cavity and extending to a point overlying and in contact with a metal plate rectifier in a cavity adjacent to said first cavity.

6. A metal plate rectifier unit comprising, in combination, a support plate of insulating material having a series of cavities therein, a series of metal plate rectifiers in said cavities, and a plurality of metal terminal strips making contact with the ends of said rectifiers in said series, and connecting the positive end of one of said rectifiers with the negative end of the adjacent rectifier whereby said rectifiers are in electrical series, each of said terminal strips located between pairs of adjacent rectifiers comprising a spring finger underlying one of said pair of rectifiers in electrical contact therewith and another spring finger overlying the other said pair of rectifiers in electrical contact therewith.

7. A metal plate rectifier unit comprising, in combination, a support plate of insulating material having a series of cavities therein, a series of metal plate rectifiers in said cavities, and a plurality of metal terminal strips making contact with the ends of said rectifiers in said series, and connecting the positive end of one of said rectifiers with the negative end of the adjacent rectifier whereby said rectifiers are in electrical series, each of said terminal strips located between pairs of adjacent rectifiers comprising a spring finger underlying one of said pair of rectifiers in electrical contact therewith and another spring finger overlying the other said pair of rectifiers in electrical contact therewith, and a rivet member securing each of said terminal strips to said support plate.

8. A metal plate rectifier unit comprising, in combination, an embossed insulating fibre sheet having the body thereof deformed to provide shallow cavities therein, said sheet having apertures therein in the bottom of each cavity, a first metal terminal strip, a rivet member securing said strip to said sheet outside said cavities, said strip extending into and along the bottom of one of said cavities, a metal plate rectifier in said cavity overlying said strip in electrical contact therewith, a second terminal strip of spring metal, a rivet member securing said second strip to said sheet outside said cavity, said second strip extending to a point overlying and in contact with a metal plate rectifier in a cavity adjacent to said first cavity.

CHESTER ARTHUR KOTTERMAN.

REFERENCES CITED

The following references are of record in the file of this patent:

UNITED STATES PATENTS

| Number | Name | Date |
|---|---|---|
| 1,898,321 | Strobel | Feb. 21, 1933 |
| 1,989,463 | Ruben | Jan. 29, 1935 |
| 2,000,642 | Lamb | May 7, 1935 |
| 2,041,569 | Reerink | May 19, 1936 |
| 2,215,667 | Sherman | Sept. 24, 1940 |
| 2,362,228 | Wright | Nov. 7, 1941 |
| 2,412,989 | Kotterman | Dec. 24, 1946 |
| 2,428,537 | Veszi et al. | Oct. 7, 1947 |

FOREIGN PATENTS

| Number | Country | Date |
|---|---|---|
| 531,488 | Germany | Aug. 10, 1931 |